United States Patent [19]

Simon

[11] 4,327,596
[45] May 4, 1982

[54] MULTI-AXES POSITIONING SYSTEM

[75] Inventor: Avi Simon, Beer Sheva, Israel

[73] Assignee: Beta Engineering & Development Ltd., Beer Sheva, Israel

[21] Appl. No.: 148,486

[22] Filed: May 9, 1980

[30] Foreign Application Priority Data

Jul. 27, 1979 [IL] Israel .................................. 57913

[51] Int. Cl.³ ...................... F16H 27/02; F16H 29/20
[52] U.S. Cl. .................................... 74/89.2; 33/1 M; 414/749
[58] Field of Search .................. 74/89.2, 89.21, 89.22, 74/479; 33/1M; 248/178, 424; 269/71, 73; 350/86; 414/749

[56] References Cited

U.S. PATENT DOCUMENTS

| | | | |
|---|---|---|---|
| 2,746,151 | 5/1956 | Kennedy | 33/1 M |
| 3,422,537 | 1/1969 | Dewey et al. | 33/1 M |
| 3,529,481 | 9/1970 | Budzyn | 74/89.21 |
| 3,611,819 | 10/1971 | Muller et al. | 33/1 M |
| 3,881,369 | 5/1975 | Looney | 74/89.22 |

FOREIGN PATENT DOCUMENTS 262600 11/1970 U.S.S.R. .............................. 414/749

OTHER PUBLICATIONS

Whistler, "Cartesian Coordinate Planar Drive System," RCA TN No. 339, Nov., 1959.

Primary Examiner—Lawrence J. Staab
Attorney, Agent, or Firm—Benjamin J. Barish

[57] ABSTRACT

A multi-axes positioning system is described, such as used in X-Y plotters, including an X-carriage movable on a frame along the X-axis, a Y-carriage movable on the frame along the Y-axis, and a single closed loop trained over a plurality of guide wheels. Some of the guide wheels are located on the frame on opposite sides of both the X- and Y-carriages, and others are located on the carriages themselves, on opposite sides thereof, and are arranged such that the single closed loop can be used for positioning the object along either two or three axes, according to single-motor, two-motor, or three-motor modes of operation.

9 Claims, 1 Drawing Figure

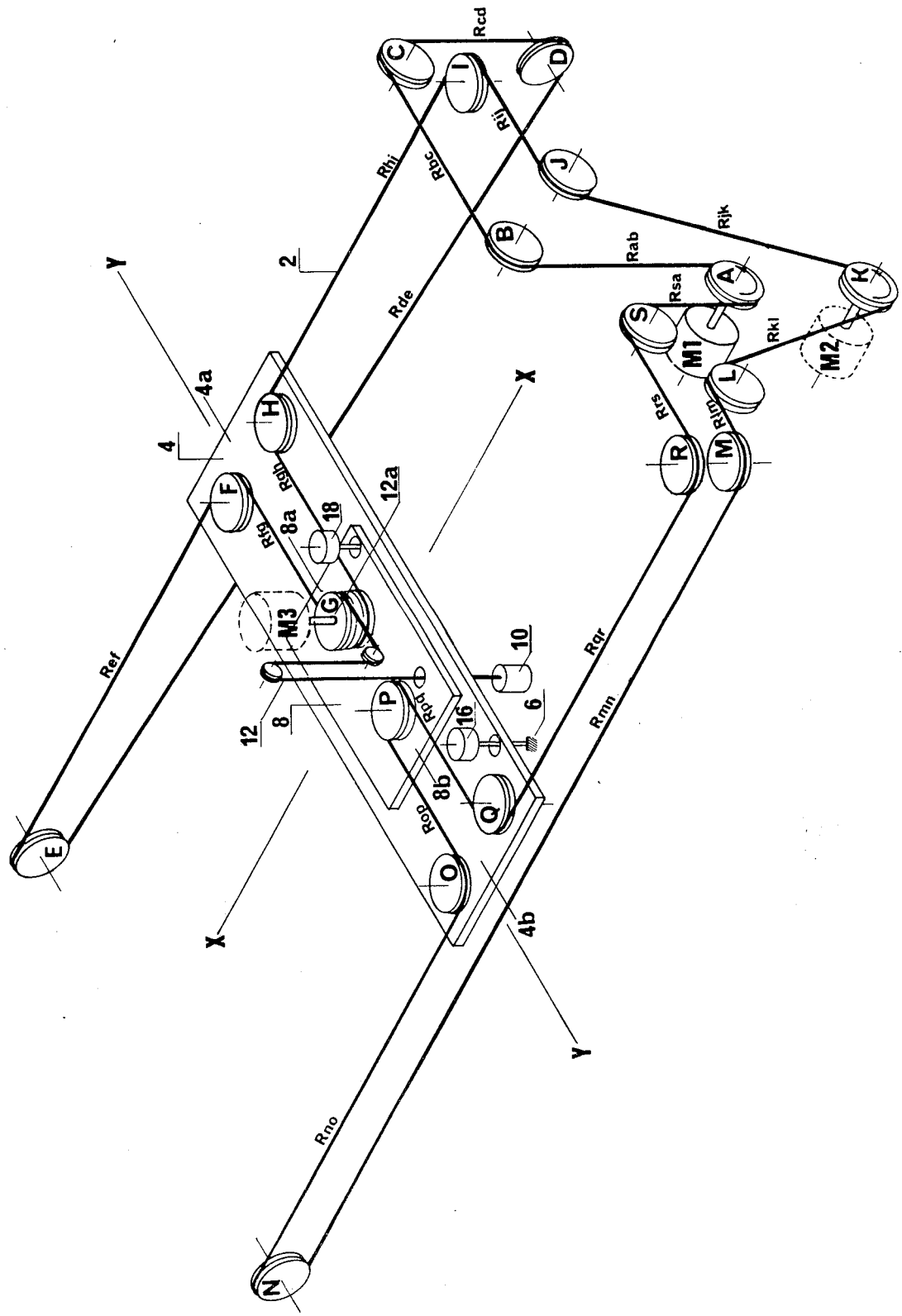

MULTI-AXES POSITIONING SYSTEM

BACKGROUND OF THE INVENTION

The present invention relates to positioning systems, and particularly to such systems for selectively positioning a device along up to three axes.

Two-axes positioning systems are frequently used in X-Y plotters, and three-axes positioning systems are frequently used in three-dimensional conveyors for conveying articles to preselected locations in space. Two-axes positioning systems commonly include an X-carriage driven along the X-axis by one drive, and a Y-carriage driven along the Y-axis by a separate drive, the object to be positioned being carried by the Y-carriage. Where the object is also to be positioned along the Z-axis, a separate drive is usually provided on one of the carriages for this purpose. Where closed-loop flexible couplings are used in the drives, a separate closed-loop is usually provided for each drive.

Such known positioning systems have a number of drawbacks. Thus, providing a separate drive for each axis increases the initial and maintenance costs in proportion to the number of axes. In addition, where closed loop couplings (e.g., cord, wire or belt) are used, special provisions are usually required either to maintain a constant tension in the separate closed loops, or else to provide compensation for any such changes in tension, which further increases the initial and maintenance costs of the system.

BRIEF SUMMARY OF THE INVENTION

An object of the present invention is to provide a positioning system which may use but only one drive for selectively positioning an object along up to three axes.

According to one aspect of the present invention, there is provided a positioning system including an X-carriage movable on a frame along the X-axis, a Y-carriage movable on a frame along the Y-axis, at least one bi-directional drive, and flexible coupling means in the form of a single closed loop trained over a plurality of guide wheels and driven by said drive for moving said carriages along both the X-axis and Y-axis; characterized in that:

(A) said plurality of guide wheels include:
  (i) first and second wheels aligned parallel to the X-axis and located on the frame on opposite sides of one end of the X-carriage;
  (ii) third and fourth wheels aligned parallel to the X-axis and located on the frame on opposite sides of the opposite end of the X-carriage;
  (iii) fifth and sixth guide wheels aligned parallel to the X-axis and located on said one end of the X-carriage;
  (iv) seventh and eighth guide wheels aligned parallel to the X-axis and located on opposite end of the X-carriage;
  (v) ninth and tenth wheels aligned parallel to the Y-axis and located on opposite sides of said Y-carriage;

(B) said flexible coupling means including on said one side of the X-carriage:
  (i) a first run between said first and second wheels;
  (ii) a second run between said second and fifth wheels;
  (iii) a third run between said fifth wheel and said ninth wheel at said one end of the Y-carriage, and
  (iv) a fourth run between said ninth wheel and said sixth wheel;

(C) Said flexible coupling means including on said opposite side of the X-carriage:
  (i) a fifth run between said third and fourth wheels;
  (ii) a sixth run between said third and seventh wheels;
  (iii) a seventh run between said seventh wheel and said tenth wheel at the opposite end of the Y-carriage; and
  (iv) an eighth run between said tenth wheel and the eighth wheel;

(D) said flexible coupling including further runs trained over further wheels and coupling said fifth run to said first run.

As will be more particularly described below, such an arrangement including a single closed loop can be used for positioning the object along either two or three axes.

According to another aspect of the invention, therefore, there is provided a positioning system including an X-carriage movable on a frame along the X-axis, a Y-carriage movable on a frame along the Y-axis, at least one bi-directional drive, and flexible coupling means trained over a plurality of guide wheels and driven by said drive for moving said carriages, characterized in that said flexible coupling means is in the form of a single closed loop trained over a plurality of guide wheels some located on the frame on opposite sides of both said X-carriage and Y-carriage, and others located on opposite sides of said carriages, and arranged so as to selectively move either or both the X-carriage and the Y-carriage by the drive. The system also includes means for selectively locking the Y-carriage to the X-carriage, and preferably also means for selectively locking the X-carriage to the frame.

It will thus be seen that the system actually requires but only one bi-directional drive, preferably an electric motor, to position the object along up to three axes, and therefore the system can be constructed inexpensively with a relatively few number of parts. In addition, it can use a single closed-loop flexible coupling, thereby avoiding the need for maintaining constant tension in a plurality of closed loops or for providing compensation in the event of changes in tension.

While the system of the present invention requires but only one bi-directional drive, as indicated above, certain advantages can be obtained, particularly in the operating speed of the system, if two or three drives are provided. Thus, if only one motor drive is provided, the movements along each of the three axes must be effected separately. If a two-motor drive is provided, the movement along the X-axis and Y-axis can be effected simultaneously, but the movement along the Z-axis must be effected separately. If Z-axis positioning is also desired to be effected simultaneously, a third motor may be provided in the drive for this purpose.

Further features and advantages of the invention will be apparent from the description below.

BRIEF DESCRIPTION OF THE DRAWINGS

The invention is herein described, by way of example only, with reference to the accompanying drawing which schematically illustrates one form of positioning system constructed in accordance with the invention. The illustrated system is a comprehensive one capable of positioning an end object along the three axes X, Y and Z, and capable of being operated according to any one of three Modes, namely, (1) a Single-Motor Mode, (2) a Two-Motor Mode, or (3) a Three-Motor Mode, depending upon the speed of positioning desired.

DESCRIPTION OF A PREFERRED EMBODIMENT

The three-axes positioning system illustrated in the attached drawing includes a single closed loop, generally designated 2, made of flexible material, such as wire, cord, belt of chain. The closed loop may be driven either by a single electric motor, shown in full lines at M1, or by motor M1 together with a second electrical motor, shown in broken lines at M2, to speed-up the operation of the system as will be described more particularly below.

The closed loop 2 drives an X-carriage 4 movable on a fixed frame 6 along the X-axis, and a Y-carriage 8 movable on the X-carriage along the Y-axis. The end object being positioned by the system is carried by the Y-carriage 8. This end object, indicated at 10 in the drawing, is suspended from one end of a cable 12, the opposite end of the cable being attached at 12a to a wheel G which is driven in either direction in order to position the end object along Z-axis. Wheel G may also be driven by the single motor M1, or by the two motors M1, M2 driving the closed-loop coupling 2. However, a third motor, shown in broken lines as M3, may be provided to drive wheel G in order to position the end object 10 along the Z-axis simultaneously with its positioning along the X and Y axes by the closed loop 2.

The flexible loop 2 is trained over a plurality of guide wheels to form the closed loop. In the illustrated example, there are 19 such guide wheels, labeled A–S. Wheel A is driven by the drive motor M1, and wheel K is driven by motor M2 when the latter is included.

The illustrated positioning system includes two locking devices, namely locking device 16, carried by the X-carriage 4, for selectively locking that carriage to the frame 6, and locking device 18, carried by the Y-carriage 8, for selectively locking that carriage to the X-carriage 4.

Of the 19 guide wheels A–S which support and drive the closed-loop coupling 2, the description below will make particular reference to the following ones:

(i) wheels D and E, which constitute first and second wheels, are aligned parallel to the X-axis and are located on opposite sides of one end (4a) of the X carriage 4;

(ii) wheels N and M, which constitute third and fourth wheels, are also aligned parallel to the X-axis but are located on opposite sides of the opposite end (4b) of the X-carriage 4;

(iii) wheels F and H, which constitute fifth and sixth wheels, are also aligned parallel to the X-axis but are located on end 4a of the X-carriage 4;

(iv) wheels O and Q, which constitute seventh and eighth wheels, are also aligned parallel to the X-axis and are located on the opposite end 4b of the X-carriage 4; and (v) wheels G and P, which constitute ninth and tenth wheels, are aligned parallel to the Y-axis and are located on opposite sides 8a, 8b of the Y-carriage 8.

It will be seen from the drawing that the closed flexible loop 2 includes the following runs on side 8a of the Y-carriage 8:

(i) a first run Rde, between wheels D and E;

(ii) a second run Ref, between wheels E and F;

(iii) a third run Rfg, between wheel F located on end 4a of the X-carriage 4, and wheel G located on end 8a of the Y-carriage 8; and (iv) a fourth run Rgh, between wheel G and wheel H located on end 4a of the X-carriage 4.

On the opposite side 8b of the Y-carriage 8, the flexible closed loop 2 includes the following additional runs:

(i) a fifth run, Rmn between wheels M and N;

(ii) a sixth run, Rno between wheels N and O;

(iii) a seventh run, Rop between wheel O located on end 4b of the X-carriage 4, and wheel P on the corresponding end 8b of the Y-carriage 8; and (iv) an eighth run, Rpq between wheel P and wheel Q located on end 4b of the X-carriage 4.

The additional runs between the other guide wheels to complete the closed loop 2 are correspondingly identified according to the letters of the guide wheels at the opposite ends of the respective run. These additional runs include runs Rqr, Rvs, Rsa, Rab, Rbc, and Rcd on one side of the closed loop 2, and runs Rhi, Rij, Rjk, Rkl, and Rlm on the opposite side of the closed loop.

As indicated above, the positioning system illustrated in the attached drawing can be selectively operated to position the end object 10 along the three axes (X, Y, X) according to any one of the three Modes of operation, which are briefly characterized as follows:

1. a Single-Motor Mode, wherein motor M1 alone is operated, in which case locks 16 and 18 are actuated to effect the positioning of the end object 10 along the Z-axis;
2. a Two-Motor Mode, wherein motors M1 and M2 are operated; or
3. a Three-Motor Mode, wherein all three motors M1, M2 and M3 are operated, in which case locks 16 and 18 are released, or may be omitted.

When the positioning system is operated according to the Single-Motor Mode, the end object 10 can be moved only along one axis at a time, the switch-over from one axis to the next being effected by the selective operation of the locks 16 or 18, as will be described more particularly below. In the two-Motor Mode operation, the end object 10 may be positioned simultaneously along the X-axis and Y-axis (the positioning along the Z-axis being done separately), thereby speeding-up the positioning of the object in the X-Y plane. The Three-Motor Mode is the fastest one since it permits the positioning of the end object 10 along all three axes simultaneously.

Following is a brief description of each of the above three modes. The Two-Motor Mode is the simplest one to describe, and will therefore be described first.

The Two-Motor Mode (M1, M2)

1. Movement along the Y-axis is effected by operating both motors M1, M2 at the same speed and in the same direction.

2. Movement along the X-axis is effected by operating both motors M1, M2 at the same speed and in opposite directions.

3. Movement at 45° in the X-Y plane is effected by operating one motor (namely motor M1), while locking the second motor (M2).

4. Any other angular movement in the X-Y plane is effected by operating the two motors at different relative speeds.

5. Rectilinear movements in the X-Y plane are effected by operating the two motors M1, M2 at constant speed, and curvilinear movements are effected by operating the two motors at varying speed.

All the foregoing movements are in the X-Y plane. During these movements the two wheels G and P, at the opposite ends of the Y-carriage 8, do not rotate, and therefore no movement is effected along the Z-axes.

In order to effect movement along the Z-axes, both locks 16 and 18 are actuated. The former locks the X-carriage 4 to the frame 6, and the latter locks the Y-carriage 8 to the X-carriage 4 and thereby also to the The foregoing three modes of operation of the positioning system illustrated in the drawing will be more readily understood by the following Table which sets forth the movements of each of the runs of the closed-loop flexible coupling 2 during each operation in the Single-Motor Mode and in the Two-Motor Mode, it being appreciated that the Three-Motor Mode operation is the same as in the Two-Motor Mode except that motor M3 is operated to effect the positioning along the Z-axis as described above:

|  |  | M1 + M2 |  |  | M1 (CCW) ALONE |  |  |
|---|---|---|---|---|---|---|---|
|  | M1, M2: CCW | M1 CCW M2 CW | M1(CCW) Y-Locked to X X-Locked to Frame | | Y Locked to X X Locked to Frame | | Y Locked to X X Locked to Frame |
| Resultant Movement | Y-Axis ↓ | X-Axis → | XY ↗ | Z-Axis θ | X-Axis → | Y-Axis ↓ | Z-Axis θ |
| Rab towards | B | B | B | B | B | B | B |
| Rbc towards | C | C | C | C | C | C | C |
| Rcd towards | D | D | D | D | D | D | D |
| Rde towards | E | E | E | E | E | E | E |
| Ref towards | F | F | F | F | F | F | F |
| Rfg towards | G | — | G | G | — | G | G |
| Rgh towards | G | — | G | H | — | G | H |
| Rhi towards | H | I | — | I | I | H | I |
| Rij towards | I | J | — | J | J | I | J |
| Rjh towards | J | K | — | K | K | J | K |
| Rhl towards | K | L | — | L | L | K | L |
| Rlm towards | L | M | — | M | M | L | M |
| Rmn towards | M | N | — | N | N | M | N |
| Rno towards | N | O | — | O | O | N | O |
| Rop towards | O | — | O | P | — | O | P |
| Rpq towards | Q | — | Q | Q | — | Q | Q |
| Rgr towards | R | R | R | R | R | R | R |
| Rrs towards | S | S | S | S | S | S | S |
| Rsa towards | A | A | A | A | A | A | A | frame 6. When locks 16 and 18 are so actuated, the closed-loop coupling 2 effects the rotation of the wheels G and P on the Y-carriage 8, so that wheel G pays-out or pays-in cable 12 supporting the end object 10 and thereby positions the end object along the Z-axis.

The Single-Motor Mode (M1)

In the Single-Motor Mode, only motor M1 is operated; motors M2 and M3 are not used and may therefore be omitted. Briefly, in the Single-Motor Mode:

1. Movement along the X-axis is effected by actuating lock 18 to lock the Y-carriage 8 to the X-carriage 4.
2. Movement along the Y-axis is effected by actuating lock 16, to lock the X-carriage 4 to the frame 6.
3. Movement along the Z-direction is effected by actuating both locks 16 and 18, to lock both carriages 4 and 8 to the frame 6.

As indicated above, in the Single-Motor Mode, the movement of the end object 10 can be effected at any one time only along one axis, and therefore if a three-axes movement of the end object is required, three separate operations must be formed, one for each of the three axes (X, Y, Z).

The Three-Motor Mode (M1, M2, M3)

In the Three-Motor Mode of operation, movement in the X-Y plane is effected by selectively operating motors M1 and M2 in the same manner as described above with respect to the Two-Motor Mode of operation. Movement along the Z-axis is effected by operating the third motor M3 to rotate wheel G to pay-in or payout cable 12 and thereby, to move the end object 10 carried by the cable along the Z-axis. It will thus be seen that the Three-Motor Mode does not require the locks 16 and 18.

While the system illustrated in the attached drawing is a comprehensive one enabling the operation of the system according to any one of the above-three described Modes, it will be appreciated that many of the elements could be omitted for any particular application. Thus, a system requiring positioning only in the X-Y plane (e.g., an X-Y plotter) does not require motor M3 which could therefore be omitted. Such a two-axis positioning system could also be operated according to the single-Motor Mode (motor M1 alone), or according to the Two-Motor Mode (motors M1 and M2) in which case locks 16 and 18 are not used and could therefore be omitted, as described above. Locks 16 and 18 would also not be necessary, and could therefore be omitted, in a three-axes positioning system which includes the third motor M3 for positioning along the Z-axis.

Further, a system operating only according to the Single-Motor Mode could of course omit motors M2 and M3. The system could also include manual drives, particularly in an arrangement having the Single-Motor and/or Two-Motor Modes of operation.

As noted above, wheels G and P do not rotate during the positioning of the end object in the X-Y plane in either the Single-Motor Mode or the Two-Motor Mode. Accordingly, while in most applications it will be preferred to have the flexible coupling 2 in the form of a single closed-loop as illustrated in the attached drawing, so as to avoid or minimize the problems of unequal tension in the flexible coupling, it is contemplated that the flexible coupling 2, namely the runs Rfg, Rgh, Rop, and Rpq, need not be trained around wheels (G, P) carried by the Y-carriage 8, but rather could merely be secured to the respective ends of the Y-carriage.

It will thus be seen that the invention permits three-dimensional positioning with but a single motor. Theoretically, one can achieve movements not only along the XYZ axes, but along a larger number (n) of axes.

Further variations, modifications and applications of the illustrated embodiment will be apparent.

What is claimed is:

1. A positioning system including an X-carriage movable on a frame along the X-axis, a Y-carriage movable on a frame along the Y-axis, at least one bi-directional drive, and flexible coupling means in the form of a single closed loop trained over a plurality of guide wheels and driven by said drive for moving said carriages along both the X-axis and Y-axis; characterized in that:
   (A) said plurality of guide wheels include:
      (i) first and second wheels aligned parallel to the X-axis and located on the frame on opposite sides of one end of the X-carriage;
      (ii) third and fourth wheels aligned parallel to the X-axis and located on the frame on opposite sides of the opposite end of the X-carriage;
      (iii) fifth and sixth guide wheels aligned parallel to the X-axis and located on said one end of the X-carriage;
      (iv) seventh and eighth guide wheels aligned parallel to the X-axis and located on opposite end of the X-carriage;
      (v) ninth and tenth wheels aligned parallel to the Y-axis and located on opposite sides of said Y-carriage;
   (B) said flexible coupling means including on said one side of the X-carriage:
      (i) a first run between said first and second wheels;
      (ii) a second run between said second and fifth wheels;
      (iii) a third run between said fifth wheel and said ninth wheel at said one end of the Y-carriage, and
      (iv) a fourth run between said ninth wheel and said sixth wheel;
   (C) said flexible coupling means including on said opposite side of the X-carriage:
      (i) a fifth run between said third and fourth wheels;
      (ii) a sixth run between said third and seventh wheels;
      (iii) a seventh run between said seventh wheel and said tenth wheel at the opposite end of the Y-carriage; and
      (iv) an eighth run between said tenth wheel and said eighth wheel;
   (D) said flexible coupling including further runs trained over further wheels and coupling said fifth run to said first run.

2. A system according to claim 1, wherein each of said drives is a bi-directional electrical motor.

3. A control system according to claim 1, further including means for selectively locking the Y-carriage to the X-carriage.

4. A system according to claim 3, further including means for selectively locking the X-carriage to the frame.

5. A positioning system including an X-carriage movable on a frame along the X-axis, a Y-carriage movable on a frame along the Y-axis, at least one bi-directional drive, and flexible coupling means trained over a plurality of guide wheels and driven by said drive for moving said carriages, characterized in that said flexible coupling means is in the form of a single closed loop trained over a plurality of guide wheels some located on the frame on opposite sides of both said X-carriage and Y-carriage, and others located on opposite sides of said carriages, and arranged so as to selectively move either or both the X-carriage and the Y-carriage by the drive; said system further including means for selectively locking the Y-carriage to the X-carriage.

6. A system according to claim 5, further including means for selectively locking the X-carriage to the frame.

7. A system according to claim 5, further including a second bi-directional drive selectively actuatable for driving one of said wheels.

8. A system according to claim 7, further including means for selectively locking said one wheel driven by said second drive.

9. A system according to claim 7, further including a third bi-directional drive carried by said Y-carriage and selectively actuatable to move an object, also carried by the Y-carriage, along the Z-axis.

* * * * *